(No Model.)  
2 Sheets—Sheet 1.
T. S. SMITH.
MECHANISM FOR OPERATING MACHINES.
No. 505,254.  Patented Sept. 19, 1893.
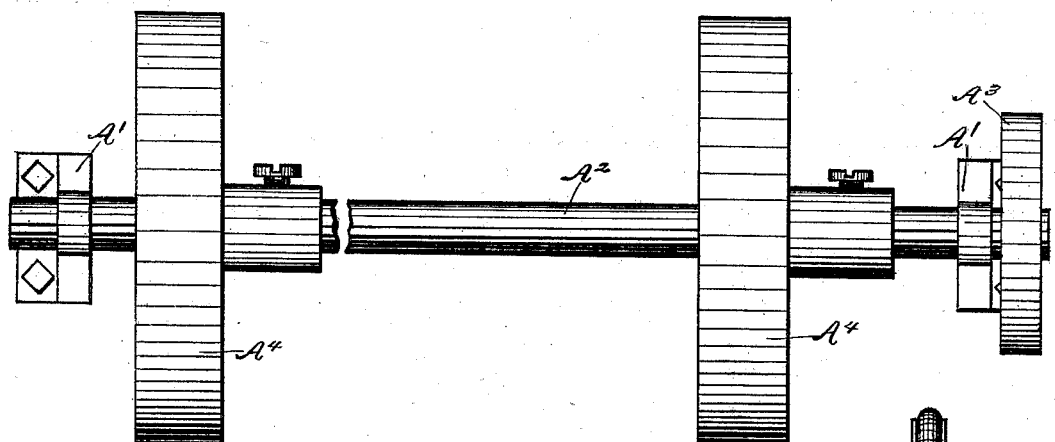
Fig. 1.
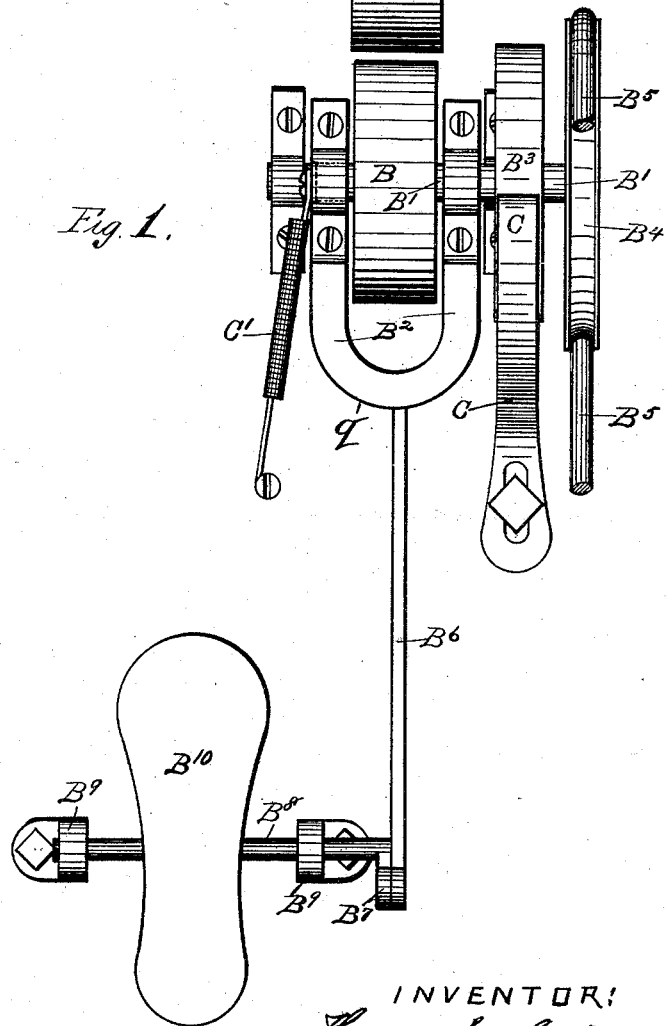
WITNESSES:  
Frank C. Curtis  
John T. Booth
INVENTOR!  
Thomas S. Smith  
by Geo. A. Mosher  
Atty.

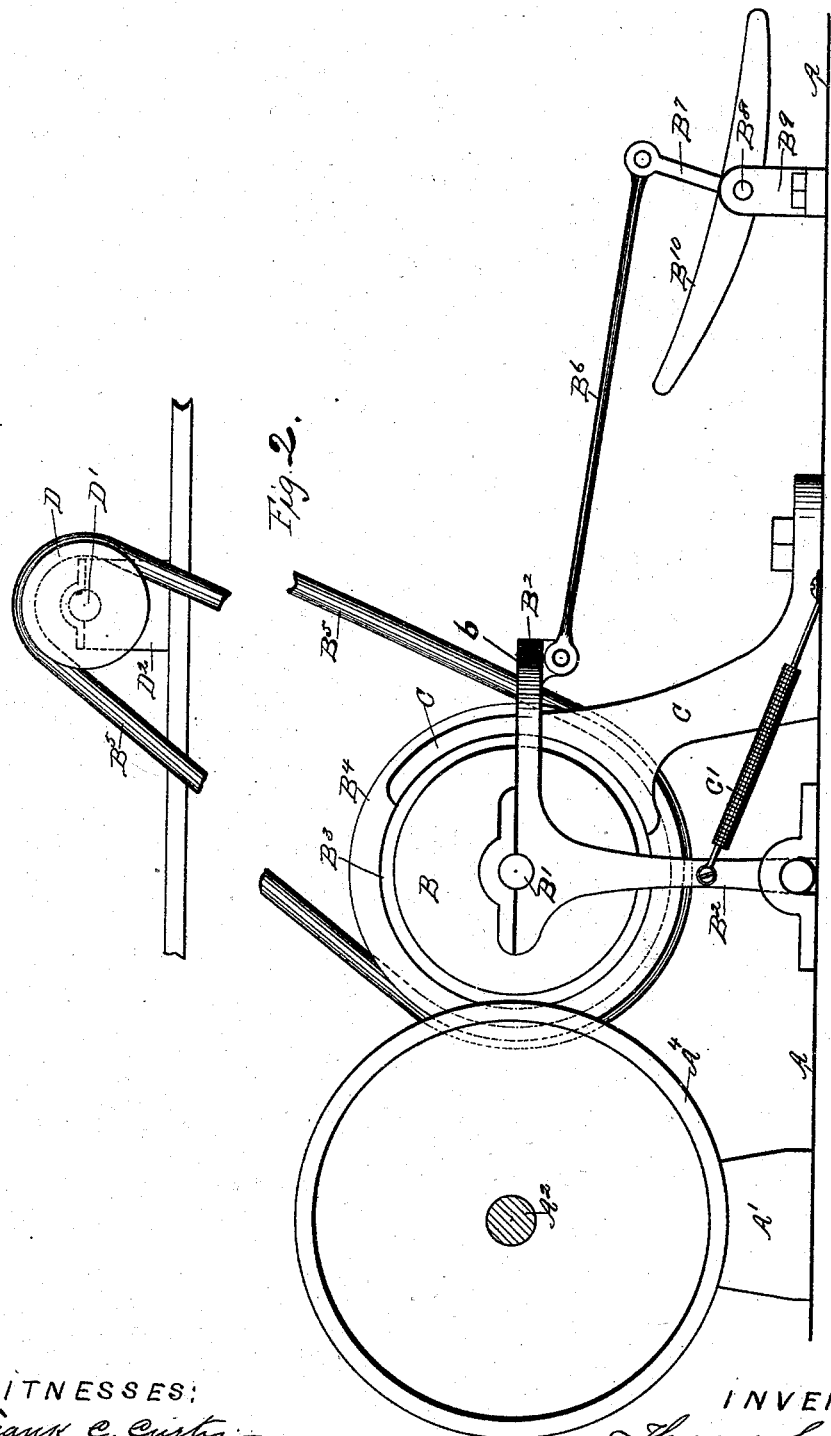

UNITED STATES PATENT OFFICE.

THOMAS S. SMITH, OF WATERFORD, NEW YORK, ASSIGNOR OF ONE-HALF TO WILLIAM W. BRESLIN, OF SAME PLACE.

MECHANISM FOR OPERATING MACHINES.

SPECIFICATION forming part of Letters Patent No. 505,254, dated September 19, 1893.

Application filed April 8, 1890. Serial No. 347,091. (No model.)

*To all whom it may concern:*

Be it known that I, THOMAS S. SMITH, a citizen of the United States, residing at Waterford, county of Saratoga, and State of New York, have invented certain new and useful Improvements in Mechanism for Operating Sewing or other Machines, of which the following is a specification.

My invention relates to such improvements and consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1 of the drawings, is a top plan view of my improved mechanism. Fig. 2 is a side view of the same in elevation.

My improved mechanism is especially adapted for use in operating sewing machines and lathes or other machinery to which it is desired to intermittingly communicate power from a continuously rotating shaft.

Various devices have been heretofore employed for a similar purpose, which have embraced a loose wheel or pulley upon the driving shaft to be frictionally or otherwise engaged by mechanism fixed upon such shaft. Such forms of construction necessitated constant frictional resistance and wear between the loose pulley and shaft, and clutch connections, while the driving mechanism was idle, thereby consuming large quantities of lubricating material, and materially affecting the durability of the parts, as well as the quantity of necessary motive power.

I employ a friction-gear and when the mechanism is idle the wheel fixed upon the driving shaft turns with it, without any frictional or other movement in relation to the shaft.

A— is the floor or bed-plate, to which are secured the uprights A'—, in which the continuously rotating driving-shaft $A^2$— has its bearings.

$A^3$— is the driving pulley fixed upon the driving shaft and $A^4$— are friction wheels fixed upon the shaft at proper intervals to engage with a friction-wheel B— adapted to drive a sewing-machine or other mechanism.

For convenience in illustration, I have shown the driving-shaft broken away in parts, and only one of a series of similar wheels B— and connecting parts. The wheel B is fixed upon a rotary shaft B'— which has its bearings in a movable frame consisting of uprights $B^2$ pivotally secured at their lower ends, and a bail or curve-connection $b$ between the uprights. I have shown the frame hinged or pivoted at its lower end upon the bed-plate and supporting the bearings in its swinging-end. The shaft B'— also supports the brake-wheel $B^3$— and the band-wheel $B^4$—. The band-wheel is connected by band $B^5$—, shown in part only, with the drive-wheel D of the sewing machine or other mechanism to be driven by the motor, not shown in the drawings. The movable frame $B^2$— is connected by link $B^6$— with the arm $B^7$— of the rock-shaft $B^8$—. The rock-shaft has its bearings in the uprights $B^9$— fixed upon the bed-plate, and its rock-lever is a foot-lever $B^{10}$. By operating the foot-lever in one direction, the movable frame and frame-supported friction-gear wheel can be forced toward the friction-wheel $A^4$— until the two friction-wheels engage with each other and the peripheral movement of the wheel $h^4$ is communicated to the periphery of the wheel B— to drive the band-wheel $B^4$—. By operating the foot-lever in the opposite direction the wheel B— is withdrawn from engagement with the wheel $A^4$ and can be forced away from such wheel until it engages with the stationary brake C— fixed upon the bed-plate, to quickly stop the machine being driven.

When desired, the hinged frame may have a controlling spring C'— secured at one end to the bed-plate or other fixed object, and at the other end to the frame. The spring will serve to hold the wheel B— in engagement with the brake except when it is forced out of engagement with it by the foot-lever, and to automatically brake the driving mechanism whenever the foot-lever is released.

Any known form of movable bearings for the shaft B' as slide-bearings, may be employed instead of the swinging frame $B^2$—.

By operating the device with the foot, the hands of the operator are free to operate the sewing-machine or other device being driven.

The driven band-wheel D— is supported by the rotary shaft D'— which has fixed bearings in a support D²—. The fixed bearings are so located relatively to the movable bearing-support of the motor shaft B'— that any movement of the latter shaft toward the drive-shaft A²— increases the distance between the shafts B'— and D'— and tightens the band B⁵— which connects the band wheels, and any movement of shaft B'— in the opposite direction will loosen the band. If therefore the band is adjusted to acquire the proper tension when the two friction-gear wheels are forced into engagement with each other, the tension will be reduced, when the wheels are thrown out of engagement or separated, in proportion to the movement of separation, and the angular position of the band-wheel shaft, supported by the fixed bearings, relatively to the line of movement of the movable bearing-support. I am able, therefore, to automatically loosen and tighten the band when the motor is thrown out of, or into, use, thereby greatly increasing the durability of the band.

What I claim as new, and desire to secure by Letters Patent, is—

In a mechanism for operating sewing machines and like machines, the combination of a friction-wheel mounted on a power-shaft, rocking standards having bearings in their upper ends and connected by a bail at their top, a friction wheel journaled in the bearings of the rocking-standards, a brake-wheel on the shaft in the rocking bearings, a band-pulley on said shaft, a spring to hold the rocking-standards outward, an adjustable standard carrying a brake-block to engage the brake-wheel, and a treadle-lever connected to the bail of the rocking standards to push them inward and carry the friction wheels into engagement, substantially as and for the purpose specified.

In testimony whereof I have hereunto set my hand this 5th day of April, 1890.

THOS. S. SMITH.

Witnesses:
ELI M. POWELL,
C. C. ORMSBY.